J. King,
Saw-Mill Head-Block.
N° 1,990.   Patented Feb. 20, 1841
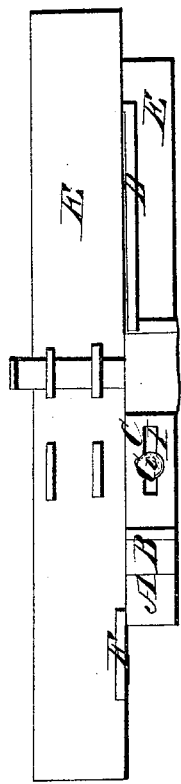
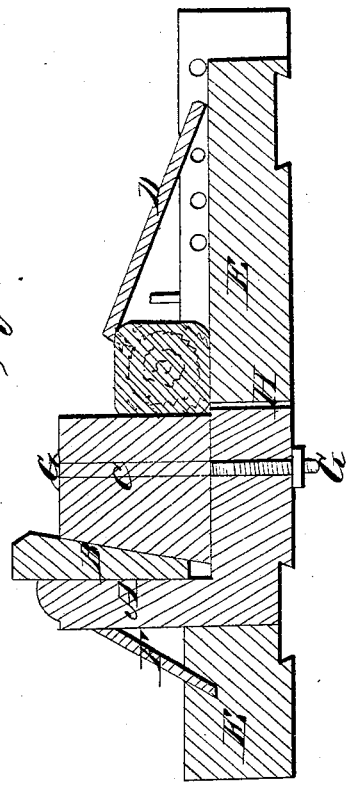

UNITED STATES PATENT OFFICE.

JAMES KING, OF SAPLING GROVE, VIRGINIA.

HEAD-BLOCK OF SAWMILLS FOR SAWING WITHOUT STUB-SHOT AND GAGING THE THICKNESS OF THE STUFF TO BE SAWED.

Specification of Letters Patent No. 1,990, dated February 20, 1841.

*To all whom it may concern:*

Be it known that I, JAMES KING, of Sapling Grove, Washington county, State of Virginia, have invented a new and useful Improvement in Sawmills, which is described as follows, reference being had to the annexed drawings of the same, making part of this specification.

The nature of this invention and improvement consists in providing the head block of the saw mill with a sliding gage for gaging the thickness of the board to be cut.

To enable others to make and use said improvement I shall proceed to describe its construction and operation.

Figure 1 is a plan of the head block. Fig. 2 is a vertical section. Similar letters of reference refer to similar parts in the figures.

The head block E is made in the usual manner, except in the particulars hereafter described.

A standard A is secured in the head block near the end next the gage C and in the line with the rabbet and securely braced by a brace F.

A strong vertical bolt G having a large flat head on the upper end and a screw and nut on the lower end is passed vertically through a round aperture in the head block between the saw channel H and the standard A—the flat head resting upon the upper side of the sliding gage block C and the nut being screwed against the under side of the head block E. The sliding gage C consists of a rectangular block perforated with a rectangular slot or opening I to admit the bolt G over which it slides backward or forward in the rabbet in sitting the same, the distance being determined by the thickness of board required to be sawed and which is regulated by similar thickness of blocks inserted between the gage C and standard A—the gage being held from rising by the screw and nut G.

The gage may be moved forward toward the log or saw by a wedge B in which case the back of the gage must be made inclining from the upper side downward and toward the standard as represented in Fig. 2 instead of vertical as before mentioned.

This arrangement will allow of the log being cut entirely up without leaving any stub shot.

Operation: The nut is loosened—the gage set for the required thickness of board to be sawed either by the wedge B or by a block the thickness of the required board placed between the standard and gage—the screw is then tightened which holds the gage firmly—the log is then stabbed and brought against the gage and dogged on the head and tail blocks in the usual manner: The sawing then proceeds, the saw cutting entirely through the log without leaving any stub shot, each board being removed as it is cut.

I am aware that the head blocks of sawmills have been provided with a sliding gage for gaging the thickness of the board to be cut, and that the slide has been moved by a screw passing through a standard and acting on the sliding gage, and that it has also been connected with a hinge frame by means of screws passing through a slot in the slide to allow of its sliding nearer to or farther from the saw, and therefore I do not claim all this as of my invention; but What I do claim as my invention and desire to secure by Letters Patent is—

The peculiar manner in which I have constructed and combined the various parts, that is to say, I claim the sliding block C provided with a slot through which the screw bolt passes to fasten it to the head block, in combination with the standard A—the space between the two being occupied by a wedge B to determine the thickness of the board to be cut all as before described.

JAMES KING.

Witnesses:
WM. P. ELLIOT,
M. A. ELLIOT.